United States Patent
Kim

(10) Patent No.: US 7,417,640 B1
(45) Date of Patent: Aug. 26, 2008

(54) METHOD FOR DOMINANT COLOR SETTING OF VIDEO REGION AND DATA STRUCTURE AND METHOD OF CONFIDENCE MEASURE EXTRACTION

(75) Inventor: Hyeon Jun Kim, Sungnam (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 09/609,392

(22) Filed: Jul. 3, 2000

Related U.S. Application Data

(63) Continuation-in-part of application No. 09/239,527, filed on Jan. 29, 1999, now Pat. No. 6,445,818.

(30) Foreign Application Priority Data

Jul. 3, 1999 (KR) .................................. 99-26784

(51) Int. Cl.
G09G 5/02 (2006.01)
(52) U.S. Cl. ........................ 345/589; 345/600; 345/619; 382/162
(58) Field of Classification Search .................. 345/418, 345/589, 581, 600, 619; 382/180, 165, 305, 382/162
See application file for complete search history.

(56) References Cited

U.S. PATENT DOCUMENTS

| | | | | |
|---|---|---|---|---|
| 4,797,738 | A * | 1/1989 | Kashi et al. | 348/93 |
| 5,222,154 | A * | 6/1993 | Graham et al. | 382/162 |
| 5,535,314 | A * | 7/1996 | Alves et al. | 382/165 |
| 6,058,211 | A * | 5/2000 | Bormans et al. | 382/235 |
| 6,266,442 | B1 * | 7/2001 | Laumeyer et al. | 382/190 |
| 6,295,367 | B1 * | 9/2001 | Crabtree et al. | 382/103 |
| 6,430,312 | B1 * | 8/2002 | Huang et al. | 382/165 |
| 6,445,818 | B1 * | 9/2002 | Kim et al. | 382/165 |
| 6,473,522 | B1 * | 10/2002 | Lienhart et al. | 382/168 |
| 6,526,169 | B1 * | 2/2003 | Murching et al. | 382/168 |
| 6,526,180 | B1 * | 2/2003 | Carley | 382/268 |

(Continued)

FOREIGN PATENT DOCUMENTS

JP 11-096364 4/1999

(Continued)

OTHER PUBLICATIONS

Multivariate data visualization for qualitative model choice in learning systems; Grishin, V.; Intelligent Control (ISIC), 1998. Proceedings of the 1998 IEEE International Symposium on , Sep. 14-17, 1998; pp. 622-627.*

*Primary Examiner*—Javid A Amini
(74) *Attorney, Agent, or Firm*—Ked & Associates, LLP

(57) ABSTRACT

A method for a dominant color setting of a video region and a data structure and a method of a confidence measure extraction are disclosed. The video region dominant color setting method is characterized in that a region dominant color descriptor is expressed by the number of dominant colors with respect to a certain region, a dominant color expressed, a frequency that the dominant color appears, and an accuracy of a color value representing the region in a region dominant color based on various region dominant color extraction methods, for thereby expressing a region dominant color using a plurality of colors with respect to a region dominant color value and a confidence value of a region dominant color information based on various region dominant color feature extracting methods.

1 Claim, 3 Drawing Sheets

U.S. PATENT DOCUMENTS

| | | | |
|---|---|---|---|
| 6,542,632 B1 * | 4/2003 | Qian et al. | 382/165 |
| 6,587,593 B1 * | 7/2003 | Matsuoka et al. | 382/260 |
| 6,658,168 B1 * | 12/2003 | Kim | 382/305 |
| 2002/0025066 A1 * | 2/2002 | Pettigrew | 382/162 |

FOREIGN PATENT DOCUMENTS

| | | | |
|---|---|---|---|
| KR | 96-28482 | * | 7/1996 |
| KR | 98-7733 | * | 3/1998 |

* cited by examiner

US 7,417,640 B1

METHOD FOR DOMINANT COLOR SETTING OF VIDEO REGION AND DATA STRUCTURE AND METHOD OF CONFIDENCE MEASURE EXTRACTION

CROSS REFERENCE TO RELATED APPLICATIONS

This application is a continuation-in-part of application Ser. No. 09/239,527, now U.S. Pat. No. 6,445,818, which was filed on Jan. 29, 1999 and which is incorporated by reference herein.

BACKGROUND OF THE INVENTION

1. Field of the Invention

The present invention relates to a dominant color feature description used in a content-based multimedia data retrieval system, and in particular to a method for setting-up a video region dominant color a data structure therefor, and a method for extracting a confidence measure, which are capable of expressing an object and a color of a ROI(Region Of Interest) in a video during a multimedia indexing operation.

2. Description of the Background Art

In a multi-media search system, there are various methods for expressing a color feature of an object and a ROI of a video in a multi-media search system. The above-described methods are applied differently in accordance with each system.

There are various methods for expressing a dominant color, such as a method for using an average color value of a region, a method for expressing the most frequently appearing color, a method for expressing n-number of the most frequently appearing colors, a method for using a color appearing in a region predetermined by threshold of P % or above, and a method using a color histogram.

Each of the above-described conventional methods has its own advantages and disadvantages. For example, the method of using the histogram has an advantage to describe color information in detail. However, it also has some problems in that the histogram has relatively large size of data and some colors represented by corresponding histogram bins can be considered as they have unnecessary region dominant color values with respect to those colors occupying relatively small regions.

In the case that a region dominant color value is expressed by one average value, there are advantages in that it is a compressed data descriptor and used for pre-filtering in a content-based searching. However, in the case that the region colors are formed in various colors, it is impossible to express the dominant color feature accurately.

Recently, a data structure for extracting the region dominant color is being standardized. However, if a unique method for the extraction of the region dominant color is not standardized and only data structure is standardized, it is impossible to maintain a compatibility of the data built in each system where a plurality of systems are used.

In addition, even when extracting the dominant color values by the same method, it is hard to achieve a reliable performance in every case.

For example, beside the problems presented when the average color is used as a dominant color, when the histogram is used to express the dominant color feature, the performance depends on the number of histogram bins, namely, the number of color levels.

If there are too large number of bins, the region color is unnecessarily expressed by too many colors for thereby decreasing a search performance, and when the region color is expressed by too few colors with a small number of bins, the region formed of various colors is not properly expressed, so that the search performance is degraded.

SUMMARY OF THE INVENTION

Accordingly, it is an object of the present invention to provide a method for setting-up a dominant color of a video region which is capable of expressing a region dominant color using a plurality of colors with respect to a region dominant color value and a confidence value of a region dominant color information based on various region dominant color feature extraction methods.

It is another object of a present invention to provide a data structure for the dominant color setting of a video region.

It is still another object of the present invention is to provide a method for extracting a confidence measure wherein the dominant color setting of a video region according to the present invention.

To achieve the above objects, a video region dominant color descriptor is provided to characterize the number of dominant colors, dominant colors, the frequency per dominant color respectively with respect to a certain region, and the confidence measure of the dominant color values and the frequencies extracted based on various region dominant color extraction methods.

Additional advantages, objects and features of the present invention will become more apparent from the description which follows.

BRIEF DESCRIPTION OF THE DRAWINGS

The present invention will become better understood from the and the accompanying drawings which are given by way of illustration only, and thus are not limitative of the present invention, and wherein.

DETAILED DESCRIPTION OF THE PREFERRED EMBODIMENTS

According to one feature of the present invention, the expression method of the region dominant color extraction method is formulated based on an extraction method type, a pre-processing description, a frequency condition description, color space description, a color sub-space description, a quantization description, a color clustering description, etc. for thereby maintaining an interoperability between different systems.

According to another feature of the present invention, the similarity between a dominant color and the similar color with the dominant color, a coherency of the color with respect to a color given, a difference between the dominant color value and the accurate value of the color when the color is considered as a certain color, a size of the region which covers the dominant color in an image region, and the positions of each color pixel in the region are adopted in order to calculate the confidence measure, so that it is possible to compare the region dominant colors values based on different feature extractions.

In addition, by expressing a confidence value for the entire region dominant colors and/or each color, it is possible to obtain a descriptor that describes the more accurate region dominant colors.

Figure 1:
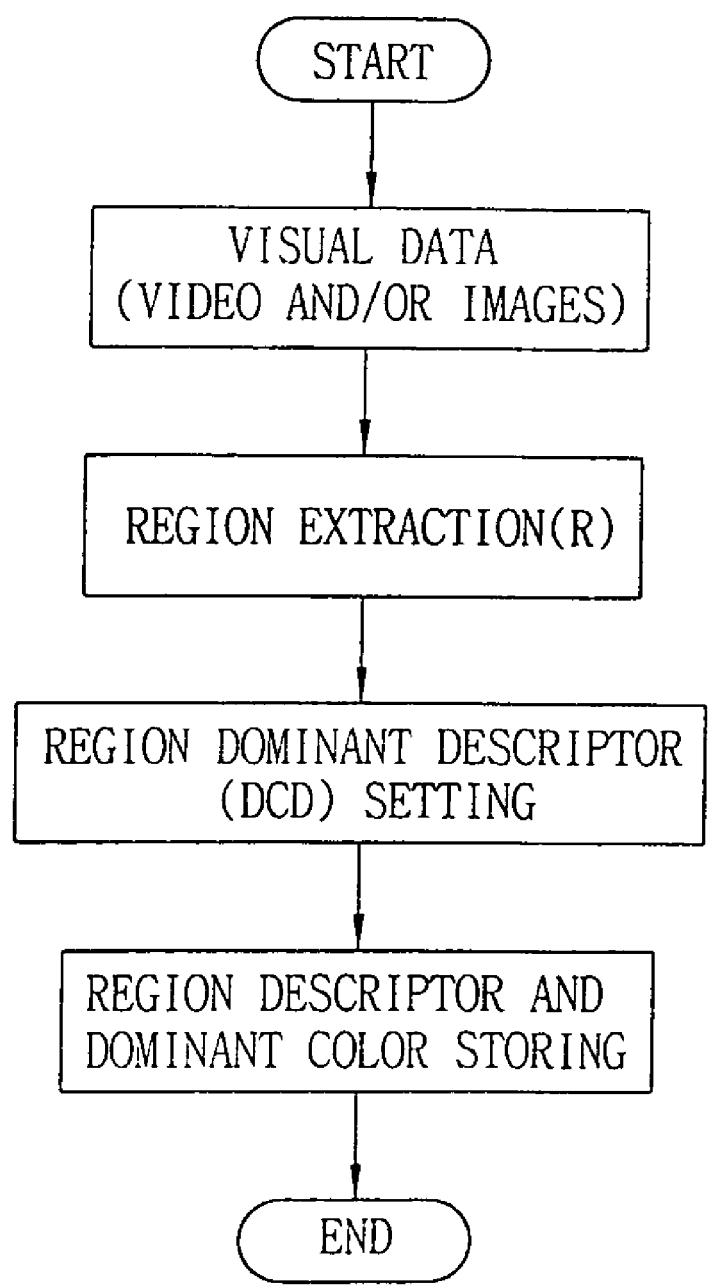
FIG. 1 is a flow chart illustrating a region dominant color setting method according to the present invention.

As shown in FIG. 1, the video region dominant color setting method according to the present invention includes a step for extracting a region R from a visual data (video and/or images), a step for setting a dominant color descriptor(DCD) with respect to the region provided, and a step for storing a region descriptor with respect to the region dominant color descriptor and the region information.

The DCD is described by the number N of the dominant colors of the color descriptor with respect to the region given, a certain dominant color Ci described by a color information (e.g. r, g, b components, etc.) and a frequency Pi which describes the degree that the dominant color appears, and a CM(Confidence Measure) of the color descriptor value.

Figure 2:
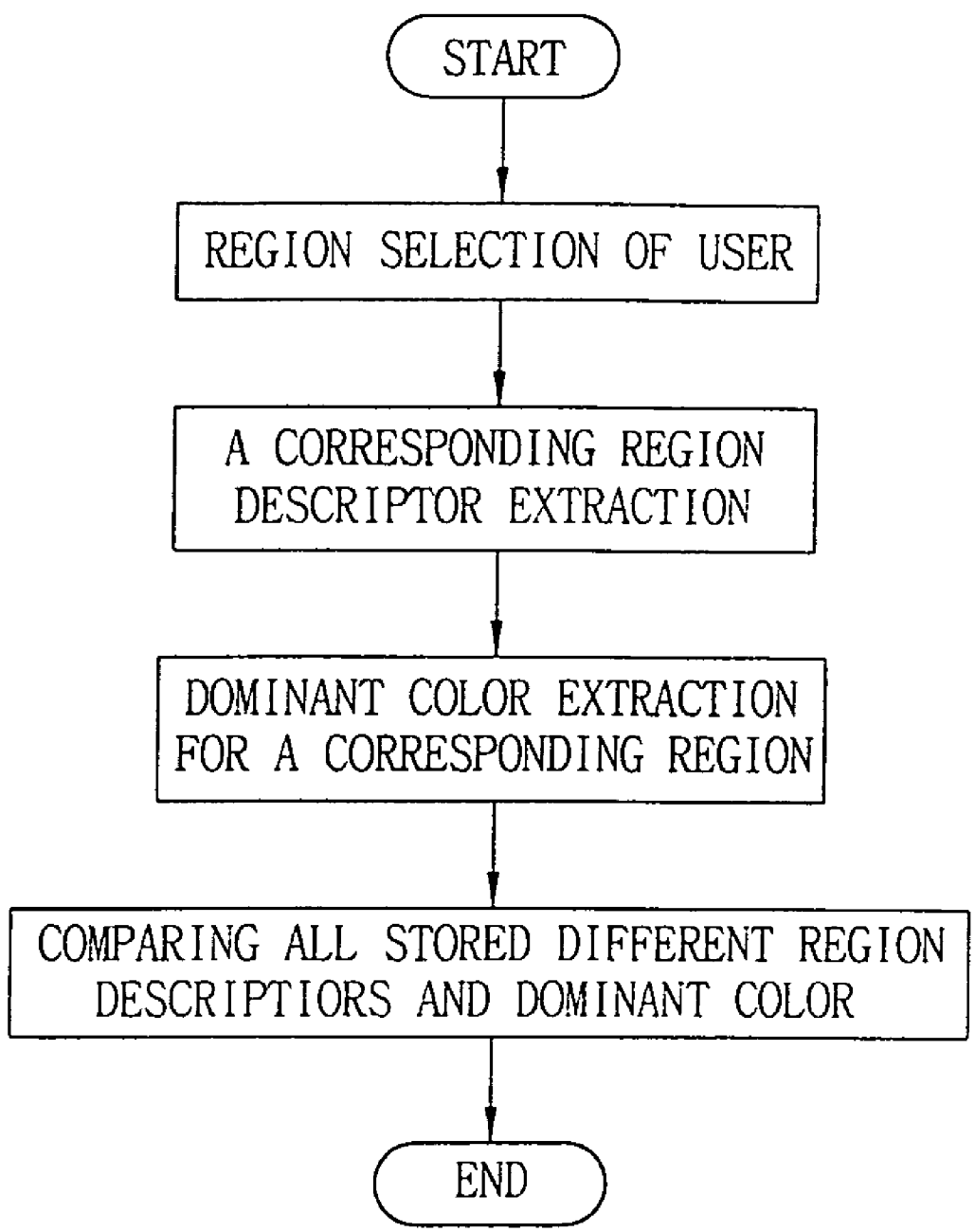
FIG. 2 is a flow chart illustrating a descriptor search method using a region dominant color settlement according to the present invention.

As shown in FIG. 2, the descriptor search method using a region dominant color includes a step for selecting a region by a user and extracting a region descriptor corresponding thereto, and a step for extracting a dominant color descriptor value with respect to a corresponding region and comparing the extracted dominant color descriptor value with each of all stored region dominant color descriptors.

Figure 3:
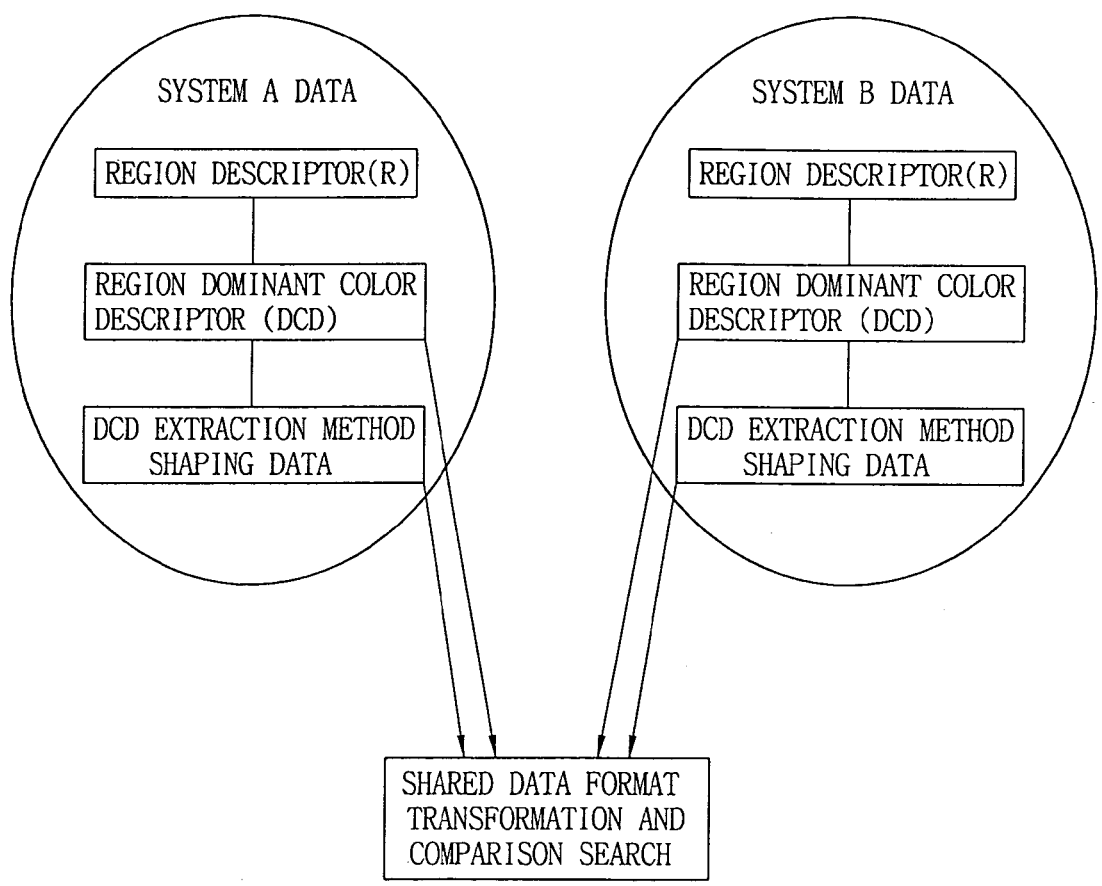
FIG. 3 is a block diagram illustrating an interoperability maintaining method between different systems using region dominant color extraction description data according to the present invention.

As shown in FIG. 3, in the interoperability maintaining method between different systems using formalized data for a region dominant color extraction method, a region dominant color descriptor(DCD) with respect to a region descriptor R of each system A and B is obtained, and the region dominant color extraction method is formalized, and the region dominant color descriptor and the description of region dominant color extraction method are converted into a sharing data format, and then a comparison search is performed with respect thereto.

The formalized data structure for description of the region dominant color extraction method includes an extraction method type for extracting a region dominant color, a pre-processing description for describing a filtering method of a certain region when obtaining the region dominant color value, a frequency condition description type for describing a condition of a frequency of a dominant color which is obtained by a histogram, a color space description type for describing a descriptor with respect to a color space used for describing the region dominant color, a color sub-space description for defining whether the region dominant color is expressed in a sub-space of the defined reference color space, a quantization description for describing a quantization method of the color space, and a color clustering description for describing when the region color is expressed based on the color clustering method.

In addition, the extraction method description includes a method using an average color value of a certain region, a method for expressing one most frequently appearing color, a method for expressing N number of most frequently appearing colors, a method for using colors which appears more than P % of threshold value in the predetermined region or a method for using a color histogram.

In the pre-processing description, it defines a filter type established when a region dominant color value is obtained, a filter size adapted in the image region, and a filter sliding method of a filter window.

The frequency condition description defines a frequency threshold for defining in a threshold value of a frequency above which the colors are set to the region dominant color, a sorting order description for designating the number of n top frequency colors of a region dominant color, and a frequency sum of top n frequency thresholds of the frequently appearing threshold value of the higher n frequency.

The color space description defines reference color space which is a reference of a dominant color and a transformation description from a refernece color space to define the transformation from a well known color space to the adopted color space, wherein the transformation description defines the number of color channels of the reference color space(?) and a transformation type and method.

In the color sub-space description, it defines the number of color channels and the color channels used, and a range of the channel, and a vector sub-space type with a method for the type, when the region dominant color only considers a sub-space of a color space.

In the quantization method description, in order to describe the quantization method of the color space, the quantization description defines the number of quantized channels and the quantized color channels, the quantization method and the number of the quantization levels for each channel, and a method used for a quantization transformation.

In addition, the color clustering description defines whether the clustering is used or not, and whether or not the number of clustering is varied in accordance with the region, the number of the clusters and the color channels used in the clustering and the method to describe each cluster.

Therefore, it is possible to perform a search among data constructed from different DCD extraction methods in different systems using the DCD extraction method description, and a search by unifying two DCD extraction methods into one method.

In addition, by adopting the DCD extraction method description, the confidence measure can be obtained for expressing the degree of accuracy of the region dominant color for thereby enhancing a search performance and implementing a compatibility among the region dominant colors which are extracted by different extraction methods.

The confidence measure is determined by all or part of factors such as a NADCA(Not Apparently Distinguishable Color Allowance) which is a maximum variance that any two colors are recognizable as the same color, and a coherency value for measuring whether or not the pixels of the colors are gathered with respect to the color given, and a CME(Color Mapping Error) which is related to an error between all color values mapping to the dominant color and the dominant color value i.e. CME is the property of the color variance of the colors clustering a dominant color, and the size of the region covered by the dominant color in the image region, and the position of the color pixels in the region.

The confidence measure extraction method includes a step for initializing the confidence measure and the count sum of the pixels, a step for obtaining a coherency value and the counting value of the corresponding color pixels with respect to all dominant colors Ci and adding a confidence of the initial value to the value obtained by multiplying the coherence value and the counting value of the color pixels for thereby obtaining a confidence with respect to all colors, and a step for obtaining a confidence with respect to the image region by dividing the obtained confidence value into the region size.

In addition, a confidence is obtained with respect to each color using a confidence extraction method.

The video region dominant color setting method will be explained with reference to the accompanying drawings.

The DCD(Dominant Color Descriptor) capable of expressing the colors of an object appearing in a visual data(video and/or images) or a region of interest (ROI) during a multimedia indexing operation is set.

The region dominant color descriptor is a color descriptor with respect to a certain region and is determined based on the entire images or a part of the image of the region, a video segment, a region having an irregular shape based on the time variance with respect to an object like a video segment, and a region for expressing a regular position in accordance with the time of the video segment.

The DCD is expressed based on the number N of the dominant colors with respect to a region provided, an l-th dominant color Ci, a frequency Pi of the dominant color Ci, and a CM(Confidence Measure) expressed by an accurate color value which represents the region.

Namely, DCD: [N, {Ci,Pi)|0<i≦N}, CM]

where N represents the number of the dominant colors in the DCD, Ci represents an i-th expressed dominant color (0<1≦N) in the DCD, Pi represents a frequency (0<i≦N) that the dominant color Ci appears in the region, and CM represents a confidence, namely, the accuracy of the color value and/or percentage value which represents the region.

Here, the dominant color Ci is defined by a plurality of parameters. Namely, it is formed of a color space description, a quantization description, a color clustering description, and a channel description such as the number of color channels.)

Therefore, it is possible to express the region dominant color based on an expression method of the DCD with respect to the region dominant color value in accordance with various region dominant color feature extraction methods, namely, a plurality of colors, and the confidence CM of the color.

For example, when the DCD1 is expressed by DCD1= [N=1, {C0=(r,g,b), P0=UNDEFINED)}, CM=k] based on the average color method, the number N of the dominant colors is 1, and the expressed dominant color(C0) becomes an average color (r,g,b) of the region, and the frequency P0 is expressed as UNDEFINED, and the confidence CM is a confidence value k in which the average value represents the region.

In addition, in the histogram, in the case that the DCD5 is expressed as DCD5=[N=64, {(C0=(r1,g1,b1), P0=10%), (C1=(r2,g2,b2), P1=5%, . . . , (C63=(r63,g63,b63), P63= 1%)}, CM=0.99], the number N of the dominant colors is the number of the histogram bin. Therefore, when expressing the histogram using 64 bins, N equals 64 and C0~C63 are expressed by the color values of a corresponding bin.

If the number of quantization levels is too large or too small when forming the histogram, the confidence has a small value. Accordingly, it is possible to check whether a proper number of quantization levels are obtained based on the confidence CM value.

FIG. 2 illustrates a description search method which is implemented using the region dominant color. In this method, if user select a region, a region descriptor corresponding thereto is extracted, and the dominant color description with respect to the above-described corresponding region is extracted. All stored region dominant color descriptors and the extracted dominant color descriptor are compared.

Therefore, since all region dominant color descriptors and the extracted dominant color descriptor are compared, it is possible to perform a descriptor search using the dominant color descriptor with respect to all region descriptors.

In addition, FIG. 3 illustrates a method for maintaining an interoperability between different systems using a region dominant color extraction method description.

In this method, a region DCD with respect to the given region R of each system A and B is extracted, and feature extraction method of the region dominant colors is described.

By transforming the above-described DCD into a sharing data format, a comparison search can be performed between different systems. In addition, by transforming each of the formalized data of the region DCD into a sharing data format and performing a comparison search between the different systems, an interoperability between the different systems can be maintained.

The description with respect to the extracting method of the region dominant color uses the following items (item 1 through item 7) to describe different extracting method of each region dominant color. Each item is divided into small items.

In the extraction method type of the item 1, it defines a method using an average color of the region, a method using one color which is most frequently appeared, a method for expressing an n number of most frequently appearing colors, a method using a color which appears more than P % of threshold value in the predetermined region or an extraction method using a histogram.

In the pre-processing description of the item 2, it defines a format of pre-processing for smoothing and burring a region when obtaining a dominant value of the region. Such a pre-processing description includes a filter type (for example, an average filter, etc.), a filter size (for example, n,m/whole/, etc), and a filter sliding method (for example, 1,1/2,3/non-over lap, etc.) for representing how to slide the filter window when adapting the filter.

The frequency condition description of item 3 is directed to how to use the frequency in which the dominant colors appear by obtaining the histogram.

In detail, it defines the threshold value of the frequency in which the frequency below the threshold value is not considered, the sorting order threshold value in which the dominant colors are set with respect to a few number among the frequencies which appear n most frequenctly, and the sum of the frequencies as threshold value, which appear n most frequently.

The color space description of item 4 is directed to a descriptor with respect to the color space itself used for indicating the region dominant color.

In detail, the refernece color space (for example, RGB, HSV, etc.) is defined, and a transformation relationship between the reference color space and a certain well known color space is described.

Namely, in the transformation description from the reference color space, the number of color channels of the adopted color space and the type of transformation (linear type/non-linear type) from the reference color space to the adopted color space are defined, and the transformation is defiened.

In the case that the transformation method to the color space is a linear type, a transformation matrix is defined, otherwise (in the case of the non-linear type), the C-code type is used for a definition method (for example, a definition based on an equation and a certain condition).

The color sub-space description of item 5 is directed to recognize whether the region dominant color is expressed in a certain sub-space of the color space defined by the color space.

In detail, in the case that the sub-space is considered, the number of the color channels and a corresponding color channel are defined, and it is defined whether the type of the vector sub-space is adopted or not (vector space type/non-vector space type), and the range of each channel is provided.

Here, since the channel range is expressed by a variable, and the channel range is changed dependent of the condition of the item.

If the vector sub-space type item is a non-vector space type, the method is not defined, and otherwise the method is clearly defined. At this time, the re-definition is clearly performed whenever the condition is changed.

The quantization description of item 6 is directed to a quantization method of the color space.

In detail, the number of the quantized channels, the quantized color channels, and the quantization type (linear type/non-linear type/vector quantization type) are defined. In addition, the number of quantization levels of each channel and the thusly defined quantization type are defined in detail.

If the quantization type is a linear type, it is described, and if the quantization type is a non-linear type, one vector is described for one color channel. In addition, in the case of the vector quantization type, it is defined by an equation and a condition method. In addition, it is possible to clearly express using a look-up table.

The color clustering description of item 7 is directed to expressing whether the color is clustered to be color quantization.

If the level type is not fixed, it is expressed that the number of clustering is varied in accordance with the region, and the number of the clusters and the clustered color channels are expressed for thereby defining each cluster.

When defining each cluster color, it is expressed based on a parameter of an ellipsoid and a centeroid of the ellipsoid.

For an example of the extraction method description for the extraction method using an average color among various extraction methods of each region dominant color, it will be explained as follows.

1. Extraction method type=average color
2. Preprocessing description:
    2-1. Filter type=Average filter
    2-2. Filter size=whole
    2-3. Filter sliding method=non-overlap
3. Frequency condition description:
    3-1. Frequency threshold=0% or n/a
    3-2. Sorting order threshold=n/a
    3-3. Frequency sum of top n frequencies threshold=100% or n/a
4. Color space description:
    4-1. Reference color space=RGB
    4-2. Transformation from reference color space description:
        4-2-1. Number of color channels=n/a
        4-2-2. Uniform type transformation=n/a
        4-2-3. Method definition=n/a
5. Color sub-space description:
    5-1. Sub-space used=FALSE
    5-2. Number of using color channels n/a
    5-3. U sing color channels=n/a
    5-4. Channel ranges=n/a
    5-5. Vector sub-space type=n/a
    5-6. Method definition=n/a
6. Quantization description:
    6-1. Number of quantized channels=3
    6-2. Quantized color channels={channel 1, channel 2, channel 3}
    6-3. Type=uniform type
    6-4. Number of quantization levels per channel=(4,4,4)
    6-5. Quantization definition=n/a
7. Color clustering description:
    7-1. Clustering used=FALSE
    7-2. Fixed level type=n/a
    7-3. Number of clusters=n/a
    7-4. Clustered color channels=n/a
    7-5. Cluster definition=n/a Namely, in the description of the extraction method using an average value, the type of the extraction method of item 1 is directed to extracting an average color.

Item 2 is directed to a pre-processing description. In the filter type 2-1 in the detailed item, an image region is average-filtered by an average filter, and what the filter size 2-2 is "whole" represents that the entire values are averaged not average-filtering the image region using a certain filter size. In addition, what the filter sliding method 2-3 is "non-overlap" represents that the earlier filter window is not overlapped with the later filter window when adapting the filter window.

In item 3, when obtaining the histogram, and the frequency is used, since the threshold value 3-1 is 0% or n/a, it means that the above-described value is not considered. In addition, since the sorting order threshold value 3-2 is n/a, it means that the above-described value is not considered. The threshold value 3-3 represents that it is not considered since the frequency sum of top n frequencies threshold is 100% or n/a.

Item 4 is a descriptor with respect to the color space itself, and the reference color space 4-1 and the transformation description 4-2 from the reference color space are directed to expressing a transformation relationship between adopted color space and the reference color space.

Namely, the reference color space is a RGB space, and since the transformation description 4-2 is n/a, it means that there is no color space which is newly adopted, and the color space which expresses the region dominant color value is RGB.

In the case that the RGB and other color space are used, and a transformation between the color space and the RGB is described, if the linear type is TRUE, one transformation matrix is defined and expressed, and in the case that the linear transformation is not defined, the equation and/or conditional sentence is used for thereby defining the item.

The description of the color sub-space of item 5 is directed to checking whether the region dominant color is expressed in a sub-space of a certain color space defined by item 4. Since the used sub-space is set as FALSE, the region dominant color value does not consider a certain sub-space.

The quantization description of item 6 is directed to a quantization method of the color space. The number 6-1 of the quantized channels is 3, and the three quantized color channels 6-2 are channel 1, channel 2 and channel 3. In addition, since the number of the quantization types 6-3 is 4,4,4, this means that the channel of each R,G,B is quantized by 4,4,4, respectively so that the nember of quantization levels is "64".

In the case that the quantization type of 6-3 is a non-uniform, one vector must be described per one color channel to define quantization point per channel, and in the case of the vector quantization type, it is expressed by some arithmetic expression.

In item 7, the color is not clustered in this example, therefore this item is not used (Clustering used=FALSE).

For another example of the extraction method description, the description with histogram extraction method is explained.

In the following extraction method, up to 10 colors are defined as the region dominant colors which are the most frequently appearing top ten colors, and a histogram with respect to the region is obtained and colors corresponding to the histogram bins are defined as the dominant colors with the condition that the frequency below 1.5% is excluded.

The items are set as follows to express this extraction method.

<Extraction Method Description Using Histogram>
1. Extraction method type=At most top ten frequently appearing colors:
2. Preprocessing description:
   2-1. Filter type=Average filter
   2-2. Filter size=5,5(means 5 by 5 filter)
   2-3. Filter sliding method=1,1
3. Frequency condition description:
   3-1. Frequency threshold=1.5%
   3-2. Sorting order threshold=10
   3-3. Frequency sum of top n frequencies threshold=n/a (or 100%)
4. Color space description:
   4-1. Reference color space=RGB
   4-2. Transformation from reference color space description:
      4-2-1. Number of color channels=3
      4-2-2. Uniform type transformation=FALSE
      4-2-3. Method definition=
      input ranges: r=(0,255), g(0,255), b=(0,255);
      output ranges: C1=(0,255), C2=(0,255), C3=(0,360);
      C1=max(r,g,b)

if max($r, g, b$) = 0, $C2 = 0$; else, $$C2 = \frac{\max(r, g, b) - \min(r, g, b)}{\max(r, g, b)}$$

if max(r,g,b)=0, C3=UNDEFINED
else if r=max(r,g,b) & (g−b>0)

$$C3 = \frac{(g - b) \times 60}{\max(r, g, b) - \min(r, g, b)}$$

else if r=max(r,g,b) & (g−b<0)

$$C3 = 360 + \frac{(g - b) \times 60}{\max(r, g, b) - \min(r, g, b)}$$

else if r=max, $$C3 = 120 + \frac{(g - b) \times 60}{\max(r, g, b) - \min(r, g, b)}$$

else $$C3 = 240 + \frac{(g - b) \times 60}{\max(r, g, b) - \min(r, g, b)}$$

5. Color sub-space description:
   5-1. Sub-space used=TRUE
   5-2. Number of using color channels=1
   5-3. Using color channels=C1
   5-4. Channel ranges=0,360
   5-5. Vector sub-space type=FALSE
   5-6. Method definition=n/a
6. Quantization description:
   6-1. Number of quantized channels=1
   6-2. Quantized color channels=C1
   6-3. Type=uniform type
   6-4. Number of quantization levels per channel=24
   6-5. Quantization definition=n/a
7. Color clustering description:
   7-1. Clustering used=FALSE
   7-2. Fixed level type=n/a
   7-3. Number of clusters=n/a
   7-4. Clustered color channels=n/a
   7-5. Cluster definition=n/a In detail, item 1 describes "at most top 10 frequently appearing colors" as the extraction method type.

In the preprocessing description of item 2, 2-1 represents that the average filter of the region is adopted, and 2-2 represents that the size of the filter having 5 by 5 is used, and what the filter sliding method of 2-3 is 1,1 represents that the center of the filter is moved by 1, 1 in the filter window in vertical and horizontal directions.

Item 3 is for the frequency condition description. Since the frequency threshold value of 3-1 is 1.5%, except for the frequency that is below 1.5%, the sorting order threshold value of 3-2 is 10. Therefore, the maximum 10 colors are designated as the dominant colors according to the frequency of the colors in the histogram, and n/a of 3-3 represents that this item is not considered.

Item 4 is a color space description. The refernece color space is RGB, and the number of the color channel 4-2-1 of the color space for the transformation description 4-2 of the reference color space is 3, and the uniform type transformation is set to FALSE therefore, the transformation between the color space adopted and RGB is a non-uniform transformation. In 4-2-3, the condition with respect to the non-uniform transformation method is described.

In addition, in the condition 4-2-3 of the non-uniform transformation method, the input ranges and output ranges of each channel are defined, where the output ranges based on the input conditions are defined.

Item 5 is the description of the color sub-space and is directed to check whether the region dominant color is expressed in a sub-space of the color space defined in item 4.

Since the used sub-space is set to TRUE, it is known that the region dominant color value considers a certain sub-space, and in 5-2, 5-3, and 5-4, it is known that one color channel C1 is considered as a channel range value of 0~360.

The quantization description of item 6 is directed to a quantization method of the color space, and number(6-1) of quantized channels is 1, and the quantized channel 6-2 is C1, and the quantization type 6-3 is defined as a uniform quantization type, and it is not needed to have a method definition 6-5.

In addition, the number 6-4 of the quantization levels of each channel represents that the channel C1 is quantized to 24-levels.

In addition, item 7 is directed to checking whether the color is clustered or not. The use of the clustering is set to FALSE which means that the clustering is not used.

The above-described data structure are defined in the header part of the memory, and whenever each item is changed, the item is re-defined.

Therefore, it is possible to clearly describe the meaning of the dominant color description among the different feature extraction methods based on the above-described feature extraction method, thereby the interoperability is satisfied in comparison search among data generated by different systems.

Namely, it is possible to conduct a comparison search by checking an extraction method with respect to the region dominant color descriptor using an extraction method description and by a step(sharing data format transformation) for integrating two region dominant color descriptors to be compatible. In addition, it is possible to maintain an interoperability between other feature extraction methods using a sharing data with respect to the region dominant color extraction method.

The confidence measure CM of the region dominant color is a descriptor which represents an accuracy of the expressed region dominant color and represents whether a corresponding region is expressed by one color and so on. The confidence CM is set by numeral values which represent the degree of confidence when the color property of the region is expressed by dominant colors.

The above-described confidence measure can be expressed by the normalized values of 0~1, and the confidence measure may be expressed by a vector value.

For example, CM=[C,ACME,P,AISI].

Here, C represents a normalized coherency (image spatial varience), and ACME represents an average of color mapping error value, P represents a valued obtained by summing the frequencies of all region dominant color values, and AISI represents an average of image space importance.

Therefore, when the confidence measure CM is expressed by a few colors, it is more useful. Namely, it is difficult to express the region by a few colors especially when the region consists of various colors. At this time, the value of the confidence is very important.

In addition, when the value of the confidence CM is low means that the region is formed of complicated various colors. Therefore, it is useful for a searching operation. In the case that more than one extraction method are provided for each region, or another feature descriptor is provided, various methods taking advantage of the confidence measure can be used.

For example, in the case that the value of the confidence measure of the region dominant color extracted by the average value extraction method is low, it is possible to use other descriptors such as a region dominant color descriptor based on the histogram extraction method, etc.

In addition, when the region dominant colors are expressed by a plurality of dominant color values based on a certain method such as an extraction method of an n-number of most frequently appearing colors, it is possible to check whether a proper number of regions is expressed or not using the confidence measure value.

The elements which are selectively adopted for extracting the above-described confidence measure will be explained.

First, when one color is expressed by a certain value, the color is varied in accordance with an increase/decrease of the color value. At this time, the maximum variation value (NADCA: Not Apparently Distinguish color Allowance) which may be recognized as the similar color can exist.

Namely, it is not judged by whether people can distinguish the slight color difference by the maximum variation. Instead, it is judged by whether colors within the maximum variation are recognized as the similar color by human, especially in a content-based image search.

A blue sky image is expressed by hundreds of colors, so that the image is naturally seen by the human eye. In the content-based image search, it is possible to express one color, namely, a certain blue color, so that too many color separations are not needed during the content-based image search.

In particular, when obtaining the region dominant color value based on an average value, it is possible to obtain the confidence measure value based on a frequency of the region that the average value covers the image region by defining the NADCA value.

In addition, a coherency value(COH) is adopted to measure whether the pixels of the color are gathered or scattered with respect to a color given. The coherency value has a value of 0 to 1. As the coherency value is increased, the confidence value is increased.

When a certain color Pj is considered (mapped) as a dominant color Ci in the image region, where respective Pj and Ci is expressed by one point in the color space, there is an error (CME: Color Mapping Error) between the accurate value and the dominant color value of the colors. As the difference is decreased, the confidence is increased, and the difference is increased, the confidence is decreased. This can be measured by color varience in the color space.

Namely, CME is as follows:

$$CME = \frac{Q}{FO}$$

In addition, the size Pi of the region that the dominant color covers in the image region is reflected to the confidence. As the size of the region that the dominant color covers is increased, the confidence of the dominant color is increased.

The confidence is reflected based on an ISI(Image Space Importance) in a region R of each color pixel. For example, if the color pixels are positioned at the center portion of the image, the colors may be considered as a more important color, and if the colors are positioned at an edge portion of the region, the colors may be considered as a less important color. Therefore, the reliability is increased when the colors of the image region which are expressed based on the representative color value are positioned at the center portion.

Namely, when the extracted confidence is high represents that the dominant colors are distanced from each other within the region, and in the case that the quantization step is near an actual NADCA value, the region colors cover the entire regions.

In addition, when the confidence is low represents that dominant colors are mixed, or the quantization steps are actually far from the NADCA value. At this time, the region colors do not fully cover the region.

The algorithm for extracting the reliability is performed by the following steps:

a) A step for setting the confidence to an initial value(=0) is performed;

b) A step for setting the sum(SUM_COUNT_PELS) of count pixels is set to an initial value(=0) is performed;

c) A value(COUNT PELS_Ci) obtained by counting the color pixels corresponding to each region dominant color with respect to all region dominant colors and a coherency COH_Ci corresponding to each region dominant color are obtained, and the coherency value COH_Ci and the count value COUNT_PELS_Ci of the color pixels are multiplied, and the confidence is added to the thusly multiplied value for thereby obtaining a confidence CM with respect to the region dominant color;

d) The confidence value is divided into region sizes SIZE_R for thereby obtaining a confidence with respect to the image region; and e) The thusly obtained confidence is outputted.

Here, the region size SIZE_R is a size in the region and is computed by the counting of the pixels in the region R.

At this time, there are two methods for computing the coherency COH_Ci with respect to one dominant color Ci value.

A first method includes:
a step (1) for inputting a size of a coherency checking mask having a certain width and height, a step (2) for setting a count (COUNT_PELS_Ci) of the color pixels and a coherent total (TOTAL_NUM_COHERENT) to an initial value(=0), and a step (3) which includes a step (3-1) for obtaining a count value (COUNT_PELS_Ci_PELS_Ci+1) of the color pixels by increasing the color pixels with respect to all pixels PELj in the region R which satisfies that the color of the pixel PELj is mapped to the dominant color, a step (3-2) for obtaining the number of coherent (0~WIDTH*HEIGHT)−1 by counting the number (except for the central pixels) of the masked pixels in the case that the color pixels masked by the central arrangement of the coherence checking mask CCM are mapped to the dominant colors, and a step (3-3) for obtaining the total number of the coherency (TOTAL_NUM_COHERENT) by summing the number of the coherency and the total number of the coherency, a step (4) for obtaining a coherency value (COH_Ci) with respect to one dominant color value by dividing the total number of the obtained coherent values by a value obtained by multiplying the total pixels (WIDTH*HEIGHT−1) to the total number of coherences except for the count value of the pixel, and a step(5) for outputting a coherency value with respect to one dominant color value and the count values of the colors and the center pixels of the pixel colors.

The second method uses a threshold value and includes a step (1) for inputting a size of a coherency checking mask (CCM) having a certain width and height, a step (2) for setting a certain number of threshold values (for example, WIDTH*HEIGHT−1), a step (3) for setting the count values of the color pixels, the total number of the coherency and the count value of the non-boundary pixels to an initial value (=0), respectively, a step (4) which includes a step (4-1) with respect to all pixels in the region which satisfies that the pixel color is mapped to the dominant color for obtaining the count values of the color pixels by up-counting the color pixels one by one, a step (4-2) for obtaining the coherent number (0~WIDTH×HEIGHT)−1 by counting the number (except for the central pixels) of the masked pixels in the case that the color pixels masked by the central arrangement of the coherency checking mask CCM are mapped to the dominant color, and a step (4-3) for obtaining a count value of the non-boundary pixels (NONBOUND_PELS) by increasing the non-boundary pixels one by one in the case that the coherent number is the same as or is larger than the boundary threshold value, a step (5) for obtaining a coherency value with respect to one dominant color by dividing the count value of the thusly obtained non-boundary pixels by the count value of the color pixels, and a step (6) for outputting the count values of the coherency value and the color pixels with respect to one dominant color.

In the above-described methods, as a condition for determining the color which is mapped with the dominant color, when a difference between the dominant colors which are not clearly separated from other colors and the pixel colors is smaller than NADCA, namely, DISTANCE(Ci, COLOR_OF_PELj)<NADCA, the above-described condition may be changed to the above-described satisfying condition (step (1) of method 1, and step (4) of method 2).

In addition, as a condition for using the same color as the dominant color, when a difference between the dominant color and the masked pixel color is smaller than NADCA, namely, DISTANCE (Ci, COLOR_OF_MASKED_PEXELk)<NADCA, the condition may be changed to the above-described condition (step (3-2) of the method 1, and step (4-2) of the method 2).

As the confidence is obtained with respect to the region dominant color by the above-described method, it is possible to obtain an interoperability during a search with respect to the region dominant color for a different feature extraction method using the confidence measure.

Namely, a certain region dominant color is obtained based on the region average value, and a certain region dominant color is obtained based on a histogram. In this case, since there is a certain confidence value, the confidence value may be usefully used for a comparison of the region dominant color values based on the different feature extractions.

In addition, the DCD extraction method shaping data is implemented as follows:

DCD1=[N=1,{(C0=gray, P0=n/a)}, CM=0.01],
DCD2=[N=1,{(C0=gray, P0=n/a)}, CM=0.99],
DCD3=[N=2,{(C0=red, P0=50%)}, (C1=cyan, P1=50%)}, CM=0.99],
DCD4=[N=2,{(C0=red, P0=50%)}, (C1=cyan, P1=50%)}, CM=0.01],
DCD5=[N=n,{(C0=red, P0=10%)}, (C1=yellow, P1=5%), . . . , (Cn−1=gray, Pn−1=1%, CM=0.99]; The average color obtained based on DCD5 is assumed as "gray".
DCD6=[N=n,{(C0=red, P0=10%)}, (C1=yellow, P1=5%), . . . , (Cn−1=gray, Pn−1=50%, CM=0.99]; The average color obtained based on DCD6 is assumed as "gray".

The dominant colors of DCD2&DCD4&DCD6 are similar based on the region dominant color descriptor, and the dominant colors of DCD1&DCD3&DCD5 are similar.

At this time, in the region dominant color descriptor, C0 is obtained based on an average value in DCD1, and (C0,P0), (C1,P1) of DCD3 are histogram when the histogram is recognized, so that it is possible to obtain an average color C* and compare with the obtained average color C* and C0 based on (C0,P0),(C1,P1).

In addition, it is possible to obtain a confidence CMi based on each color Ci except for the confidence value with respect to the total region dominant color descriptor DCD.

Namely, DCD=[N,{Ci, Pi, CMi |0<i≦N)}, CM].

The confidence with respect to each color is determined based on various elements as arranged in the confidence for the region, namely, normalized coherency (spatial variance), color mapping error CME (color variance), the size of region that the dominant color covers, and the position of each color pixels in the region for thereby obtaining a confidence value with respect to the determined color. Therefore, CMi can be represented by a vector such that CMi=[SpatialVariance, ColorVariance, SizeOfCovers, Position].

The SpatialVariance which is inverse proportional to the coherency can be defined similarly as in p24–26.

The ColorVariance value with respect to a certain color based on the color variance which is inverse proportional to the color mapping error CME may be obtained based on the following equation.

$$\text{ColorVariance}\_Ci = \text{SUM}[\text{Distance}(\text{CENTROID}\_Ci, \text{MAPPING\_COLOR\_POINT}\_Pj\_TO\_Ci)/ \text{MAX\_DISTANCE}\_Pj\_TO\_Ci \times \text{NUM\_MAPPING\_COLOR\_POINT}\_Pj\_TO\_Ci] \text{ for all } j$$

$$CM = \text{Sum}(CM\_Ci) \text{ for all } i/\text{MAX}\_i + 1$$

Namely, the ColorVariance with respect to a certain dominant color is a difference with respect to all colors which are recognized as a dominant color, and DISTANCE(CENTROID_Ci, MAPPING_COLOR_POINT_Pj_TO_Ci) is a difference with respect to the color Pj when the color is assumed as the dominant color Ci.

MAX_DISTANCE_Pj_TO_Ci is a maximum distance difference between two colors (Pj, Ci).

NUM_MAPPING_COLOR_POINT_Pj_TO_Ci is the total number that the color Pj is mapped to Ci as the maximum value of j.

The values obtained by the above-described methods are normalized, and the confidence with respect to a certain dominant color has a value between 0 and 1.

The confidences with respect to all dominant color values are summed(SUM(CM_Ci) for all i (where i represents an integer, o<i<M) and is divided by the maximum value (MAX_i+1) for thereby obtaining an average value of CM_Ci, namely, the confidence CM with respect to the image region.

As described above, the region dominant color descriptor and the confidence of the same are expressed based on a similarity of the color with respect to the image region, an error of the same, the size that the dominant color covers the region, and the position of the region, so that it is possible to enhance a search performance and to provide an interoperability between the region dominant colors based on different extraction methods.

In addition, a standardized method is implemented by the extraction method description of the region dominant color descriptor using a color space descriptor, a quantization descriptor, a color cluster descriptor, and the number of color channels, so that it is possible to conduct a comparison search between the extracted region dominant colors extracted by various methods.

The present teaching can be readily applied to other types of apparatus. The description of the present invention is intended to be illustrative, and not to limit the scope of the claims. Many alternatives, modifications, and variations will be apparent to those skilled in the art.

What is claimed is:

1. A confidence measure extraction method of a dominant color of an image region, comprising:
    obtaining a number of color pixels corresponding to each dominant color and a coherence value corresponding to each dominant color;
    multiplying the coherence value by a value corresponding to the number of color pixels with respect to each dominant color, adding the multiplied values with respect to all of the region dominant colors; and
    dividing the thusly added multiplied values by a region size and extracting a confidence value descriptive of dominant colors in the image region.

* * * * *